(12) United States Patent
Golden et al.

(10) Patent No.: US 12,708,874 B2
(45) Date of Patent: Aug. 18, 2026

(54) STEEL MILL OFFGAS SEPARATION AND PURIFICATION

(71) Applicant: Air Products and Chemicals, Inc., Allentown, PA (US)

(72) Inventors: Timothy Christopher Golden, Nevez (FR); Mozhgan Alimohammadi Zanjani, Flemington, NJ (US); Edward Landis Weist, Jr., Macungie, PA (US); Eryk Remiezowicz, Osówiec (PL); Roger Anthony Dewing, Hampshire (GB); Yu Zhang, Orefield, PA (US); Thierry Giraud, Braine l'Alleud (BE); David Ross Graham, Harleysville, PA (US); Toby Amott, Surrey (GB); Jeffrey Carl Mocsari, Hamilton, NY (US)

(73) Assignee: AIR PRODUCTS AND CHEMICALS, INC., Allentown, PA (US)

(*) Notice: Subject to any disclaimer, the term of this patent is extended or adjusted under 35 U.S.C. 154(b) by 322 days.

(21) Appl. No.: 18/216,179

(22) Filed: Jun. 29, 2023

(65) Prior Publication Data

US 2025/0001359 A1 Jan. 2, 2025

(51) Int. Cl.
*B01D 53/86* (2006.01)
*B01D 53/02* (2006.01)

(52) U.S. Cl.
CPC ........... *B01D 53/869* (2013.01); *B01D 53/02* (2013.01); *B01D 53/8606* (2013.01);
(Continued)

(58) Field of Classification Search
CPC .. B01D 53/869; B01D 53/02; B01D 53/8606; B01D 53/8621; B01D 53/8693;
(Continued)

(56) References Cited

U.S. PATENT DOCUMENTS 3,460,934 A 8/1969 Kelmar
3,784,370 A 1/1974 Stephenson, Jr.
(Continued)

FOREIGN PATENT DOCUMENTS

CN 115109621 A * 9/2022 ............... C10K 1/34
EP 2258996 A1 * 12/2010 ............ B01D 53/14
(Continued)

OTHER PUBLICATIONS

David F. Sanders, et al; Energy-Efficient Polymeric Gas Separation Membranes for a Sustainable Future: A Review; Polymer 54 (2013) 4729-4761; Elsevier Ltd (www.elsevier.com); May 19, 2013, 33 pgs.

*Primary Examiner* — Dung H Bui
(74) *Attorney, Agent, or Firm* — Jason M. Ploeger; DaLesia H. Boyd

(57) ABSTRACT

A method comprising contacting an offgas stream comprising H2, H2O, CO, CO2, and at least one impurity comprising COS with at least one metal oxide to catalyze a reaction of H2O and COS to form H2S and CO2 in the offgas stream; contacting the offgas stream with an H2S-adsorbent to remove H2S from the offgas stream to produce a treated gas stream; and separating the treated gas stream to produce a carbon dioxide-enriched stream and a carbon dioxide-depleted stream.

17 Claims, 5 Drawing Sheets

(52) U.S. Cl.
CPC ..... *B01D 53/8621* (2013.01); *B01D 53/8693* (2013.01); *B01D 2253/102* (2013.01); *B01D 2253/1124* (2013.01); *B01D 2256/10* (2013.01); *B01D 2256/16* (2013.01); *B01D 2257/304* (2013.01); *B01D 2257/406* (2013.01); *B01D 2257/502* (2013.01); *B01D 2257/7027* (2013.01)

(58) Field of Classification Search
CPC ...... B01D 2253/102; B01D 2253/1124; B01D 2256/10; B01D 2256/16; B01D 2257/304; B01D 2257/406; B01D 2257/502; B01D 2257/7027; B01D 53/04; B01D 53/0462; B01D 53/047; B01D 53/261; B01D 2251/602; B01D 2255/2045; B01D 2255/2047; B01D 2255/20707; B01D 2255/2073; B01D 2255/20738; B01D 2255/20753; B01D 2255/20784; B01D 2255/20792; B01D 53/52; B01D 53/75; B01D 2257/308; B01D 2257/408; B01D 2257/504; B01D 2257/80; B01D 2258/025
See application file for complete search history.

(56) References Cited

U.S. PATENT DOCUMENTS 4,171,206 A 10/1979 Sircar
4,363,654 A 12/1982 Frederick et al.
4,713,090 A 12/1987 Yokoe et al.
4,770,676 A 9/1988 Sircar et al.
4,790,858 A 12/1988 Sircar
4,844,737 A 7/1989 Oono et al.
4,914,076 A 4/1990 Tsuji et al.
4,915,711 A 4/1990 Kumar
4,917,711 A 4/1990 Xie et al.
4,917,727 A 4/1990 Saito et al.
5,026,406 A 6/1991 Kumar
5,045,522 A * 9/1991 Kidd .................... C01B 17/508 502/238
5,126,310 A 6/1992 Golden et al.
5,175,137 A 12/1992 Golden et al.
5,234,490 A 8/1993 Kundrat
5,258,571 A 11/1993 Golden et al.
5,300,271 A 4/1994 Golden et al.
5,354,346 A 10/1994 Kumar
5,529,763 A 6/1996 Peng et al.
5,674,463 A 10/1997 Dao et al.
5,897,686 A * 4/1999 Golden ................ B01D 53/047 95/123
5,935,420 A * 8/1999 Baird, Jr. ............. C10G 25/003 208/213
5,935,894 A * 8/1999 Kanazirev ................ B01J 23/02 502/344
6,428,606 B1 * 8/2002 Gottschlich .......... B01D 53/225 95/50
8,057,734 B2 11/2011 Drnevich et al.
8,709,136 B2 4/2014 Hsu et al.
8,801,835 B1 * 8/2014 Fisher .................. B01D 53/263 95/193
10,232,311 B2 3/2019 Rossin
11,505,462 B2 * 11/2022 Ravikumar ............ B01J 19/245
11,617,984 B2 4/2023 Mukherjee
12,233,397 B2 * 2/2025 Xu .......................... B01J 20/06
12,357,967 B2 * 7/2025 Sunkara ............... B01J 37/0201
2004/0140244 A1 * 7/2004 Sughrue .................. B01J 20/10 208/15
2006/0260189 A1 * 11/2006 Reddy ........................ C10J 3/00 48/128
2007/0023325 A1 * 2/2007 Kumar ................ C10G 25/003 208/213
2007/0028772 A1 * 2/2007 Jain ........................ B01D 53/04 95/135
2010/0111784 A1 5/2010 Mak et al.
2010/0129284 A1 * 5/2010 Niitsuma ................ C01B 3/382 423/437.1
2010/0322845 A1 * 12/2010 De Souza ................ C01B 3/56 96/4
2011/0094378 A1 * 4/2011 Mitariten ................ C10L 3/101 95/96
2011/0185898 A1 * 8/2011 Sundaram .......... B01D 53/0473 95/55
2012/0010306 A1 * 1/2012 Chiche ..................... C10K 1/32 252/373
2012/0058921 A1 3/2012 Van Den Berg et al.
2012/0240617 A1 * 9/2012 Weiss ................ B01D 53/1462 62/611
2012/0330060 A1 * 12/2012 Eliasson ............... C07C 273/04 95/128
2014/0186248 A1 * 7/2014 Mishra ................ B01D 53/523 423/230
2014/0230606 A1 8/2014 Traversac et al.
2014/0360368 A1 * 12/2014 Nakamoto ............ B01D 53/02 96/144
2015/0182946 A1 * 7/2015 Alhooshani .......... B01J 20/0244 252/190
2016/0288083 A1 * 10/2016 Evans ...................... B01J 20/16
2018/0169609 A1 * 6/2018 Evans ................. B01J 20/2803
2020/0231882 A1 * 7/2020 Sunkara ............... C10G 25/003
2020/0360854 A1 * 11/2020 Vaidya ................... B01D 71/32
2021/0309517 A1 10/2021 Russell et al.
2022/0168703 A1 * 6/2022 Wang ................... B01J 20/3078
2022/0194789 A1 * 6/2022 Christensen ............. F25J 3/067
2022/0372587 A1 * 11/2022 Motamedhashemi .. C21B 11/10
2023/0020425 A1 * 1/2023 Guerif .................. B01D 53/047
2023/0183064 A1 * 6/2023 Foody .................... C10K 1/005 423/220
2024/0166509 A1 * 5/2024 Russell ..................... C01B 3/24
2024/0253986 A1 * 8/2024 Schmid Mcguinness .................. C01B 3/506
2024/0279057 A1 * 8/2024 Frommweiler ........... C01B 3/38
2025/0050296 A1 * 2/2025 Nakama ................. B01J 8/0496
2025/0051161 A1 * 2/2025 Leitmayr .................. C01B 3/48
2025/0223160 A1 * 7/2025 Cassidy .................. C01B 3/382

FOREIGN PATENT DOCUMENTS

EP 2253915 B1 6/2018
FR 2947185 A1 * 12/2010 ................ C10L 3/10
GB 1218912 1/1971
JP 2009108241 A 5/2009
WO WO-2006008317 A1 * 1/2006 .............. C01B 3/54

* cited by examiner

STEEL MILL OFFGAS SEPARATION AND PURIFICATION

BACKGROUND

The iron- and steel-making industries are a major emitter of CO2, responsible for around 6% of global emissions. Typically, iron and steel production involve several carbon-intensive processes such as production of coke in coke ovens, production of pig iron in blast furnaces, and production of steel in basic oxygen furnaces. Each process produces an off-gas with a CO2 component that may be captured, however each type of off-gas has a different composition, requiring a flexible pretreatment and separation process.

BRIEF DESCRIPTION OF THE DRAWINGS

The drawings illustrate certain aspects of some of the embodiments of the present invention and should not be used to limit or define the invention.

DETAILED DESCRIPTION

The present disclosure is directed to methods for treating and separating an offgas stream into carbon dioxide, carbon monoxide, and/or hydrogen streams. The methods may be utilized for recovering valuable products from an offgas stream in the iron- and steel-making industries. The methods may include a pretreatment step in which impurities such as COS, H2S, SOx, NOx, HCN, and BTEX may be removed in one or more unit operations. The pretreatment step may hydrolyze the COS to form H2S prior to removing H2S. The methods may include a carbon dioxide removal step in which a carbon dioxide-enriched stream may be produced by adsorption or absorption, which may require dehydration prior to sequestration. In some embodiments, the methods may include a carbon monoxide removal step in which a carbon monoxide-enriched stream may be produced by adsorption or cryogenic distillation. The methods may include a hydrogen purification step in which a hydrogen-enriched product stream may be produced by adsorption. The tail gas stream comprising waste gas from the hydrogen purification step may be used to regenerate the dehydration of the carbon dioxide stream. The method may comprise performing the carbon dioxide removal step after hydrolyzing the COS, wherein H2S may follow the carbon dioxide and may be removed from the carbon dioxide-enriched stream.

Figure 1:
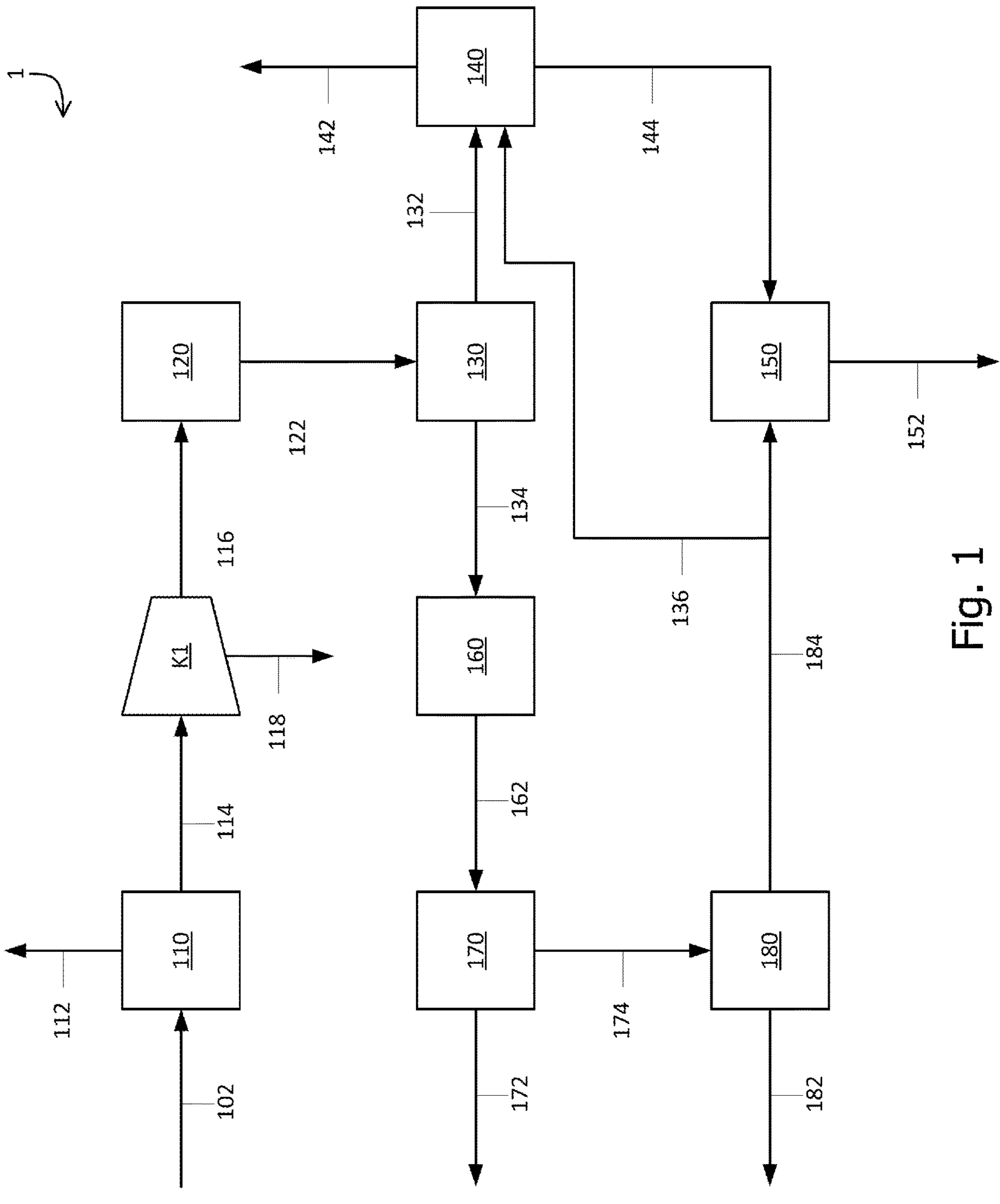
FIG. 1 is a schematic view depicting an embodiment of an offgas separation process according to one or more aspects of the present disclosure.

FIG. 1 is a schematic view depicting an embodiment of an offgas separation process according to one or more aspects of the present disclosure. Process 1 separates offgas stream 102 to produce enriched CO2, CO, and H2 streams. Offgas stream 102 may comprise blast furnace gas (BFG), basic oxygen furnace gas (BOFG), coke over gas (COG), or any combination of the three. All three sources of offgas may comprise CO, CO2, H2, and N2. BFG may be relatively rich in N2, BOFG may be relatively rich in CO, and COG may be relatively rich in H2. The compositions of the offgas may vary over time, either by variation in the process and/or variation in the relative amounts of BFG, BOFG, and COG. Offgas stream 102 may first enter particle removal section 110 in which waste stream 112 comprising solid particles may be removed from offgas stream 102, yielding scrubbed offgas stream 114. The solid particles may negatively impact downstream equipment such as compressors and/or adsorption vessels. Particle removal section 110 may include a dry scrubber (cyclone separator), a wet scrubber, and an electrostatic precipitator (ESP) in any combination and order.

Scrubbed offgas stream 114 may then be compressed if necessary for downstream processing in compressor K1. Compressor K1 may comprise multiple compressors in series or compressors with multiple stages as required to most efficiently compress scrubbed offgas stream 114 and produce compressed offgas stream 116. Water knockout stream 118 may be produced by compressor K1 comprising sulfur and nitrogen oxides. If the downsteam processing immediately following compressor K1 requires higher temperatures, for example ranging from 150 to 300° C. (300 to 570° F.), the final stage of compression may have a reduced cooling duty and/or a heater to bring compressed offgas stream 116 to the desired temperature.

Compressed offgas stream 116 may enter pretreatment section 120 to remove impurities that may damage downstream processing. These impurities may include iron carbonyl (Fe(CO)5), hydrogen sulfide, carbonyl sulfide (COS), sulfur oxides (SOx), nitrogen oxides (NOx), BTEX (benzene, toluene, ethylbenzene, and/or xylene), hydrogen cyanide, halides, ammonia, and oxygen. Impurities may be found in offgas stream 102 in the parts per million by volume range (ppmv) and may permanently react with adsorbents and/or support materials used in downstream processing. Pretreatment section 120 may comprise a pretreating adsorbent to remove the one or more impurities. The pretreating adsorbent may comprise an H2S-adsorbent material such as zinc oxide, iron oxide, magnesium oxide, chromium oxide, cobalt oxide, copper oxide, manganese oxide or activated carbon. The H2S-adsorbent material may directly adsorb and/or react with H2S, or it may also catalyze the oxidation of H2S to form elemental sulfur and water. The pretreating adsorbent may also comprise at least one metal oxide such as alumina, titania, MnO2, CuO, CaO, MgO, and NiO. In some embodiments the at least one metal oxide is a basic metal oxide. In some embodiments the same material may serve as the H2S-adsorbent material and the at least one metal oxide. The H2S-adsorbent material may have a bulk density ranging from 640 to 1600 kg/m3 (40 to 100 lb/ft3), or from 800 to 1440 kg/m3 (50 to 90 lb/ft3), or from 800 to 1280 kg/m3 (50 to 80 lb/ft3) and a surface area ranging from 30 to 300 m2/g ($1.5\times10^5$ to $1.5\times10^6$ ft2/lb), or from 80 to 250 m2/g ($4\times10^5$ to $1.2\times10^6$ ft2/lb), or from 100 to 200 m2/g ($5\times10^5$ to $1\times10^6$ ft2/lb). The H2S-adsorbent material may vary in particle size from 2 to 6 mm in diameter. The H2S-adsorbent material may comprise particles with a combination of metal oxides or a physical mixture of particles with different compositions of metal oxides. The pretreatment section 120 may be arranged in a two-bed lead/lag system in which two beds of H2S-adsorbent material are connected in series. When the impurities break through the lead bed and start entering the lag bed, the lead bed may be removed from service and the adsorbent material may be removed for disposal, regeneration, or recycle. Regeneration may be performed by reacting the sulfur-loaded H2S-adsorbent material with oxygen at temperatures ranging from 300 to 450° C. (570 to 840° F.) to convert the H2S to SOx. When fresh H2S-adsorbent has been replaced in the lead bed, it may be placed back online downstream of the lag bed and the two beds switch roles. The adsorbent beds may be sized such that bed replacement may occur every 3 to 12 months.

The pretreating adsorbent may be uniquely capable of removing a wide range of impurities in a single unit operation without reacting with H2 and CO in the offgas, either by using materials that do not react with H2 and/or CO, or in the case of iron-based materials, operating at a temperature low enough to render any reaction rates negligible.

In at least some embodiments, compressed offgas stream 116 may enter the pretreatment section 120 at a temperature ranging from 50 to 300° C. (120 to 570° F.), or from 230 to 300° C. (450 to 570° F.), at which temperature iron carbonyl decomposes to form metallic iron and carbon monoxide, the former of which deposits on the pretreating adsorbent. H2S-adsorbents in natural gas applications may typically operated above 400° C. (750° F.) in order to maximize H2S capacity, however in the present disclosure the benefit of high temperature operation may be outweighed by increased side reactions in the offgas such as methanation. Furthermore, the lower operating temperature may allow lower density pretreating adsorbent with higher surface area. COS may be difficult to remove by adsorption, however the hydrolysis of COS to form CO2 and H2S may be catalyzed by the at least one metal oxide such as titania, alumina, hydroxide-modified alumina, CoMo catalyst on an alumina support, hydrotalcite, or combinations thereof. H2S produced by COS hydrolysis, as well as H2S in the compressed offgas, may be removed by reacting the at least one metal oxide to form a corresponding metal sulfide and water. In at least some embodiments some H2S may also be removed via the Claus reaction where O2 present in compressed offgas stream 116 may react with H2S in the presence of a catalyst like alumina or titania to form elemental sulfur which may deposit on the pretreating adsorbent. SOx and NOx may react with O2 and the at least one metal oxide to form a corresponding metal sulfate and nitrate, respectively. HCN may react with the at least one metal oxide to form a corresponding metal cyanide and water. HCN may also be removed by hydrolysis to form NH3 and CO, which may be catalyzed by an oxide of at least one metal selected from the Group VI metals, the Group IVB metals, and mixtures thereof. Examples of HCN hydrolysis catalysts include combinations of alumina, titania, zirconia, and/or molybdenum oxide. Halides may also be removed by reacting with the at least one metal oxide, alkali hydroxides, alkaline earth hydroxides, carbonates, oxides either supported or unsupported, hydrotalcite, and clays. The mixture of an H2S-adsorbent and at least one metal oxide may allow removal of a wide range of impurities to a safe level, yielding treated offgas stream 122 for downstream processing. Pretreatment section 120 may more impurities with fewer and simpler unit operations. In some embodiments, the pretreatment reactions may either consume or produce water and/or oxygen, but because the concentration of the one or more impurities may range in the parts per million by volume this may neither substantially increase nor decrease the concentration of water and/or oxygen in treated offgas stream 122. A substantial increase or decrease may be defined as less than or equal to ±500 ppmv, or less than or equal to ±300 ppmv, or less than or equal to ±100 ppmv. This may provide an advantage over pretreatment methods such as temperature swing adsorption that may remove water from compressed offgas stream 116 because the presence of water vapor may allow removal of COS and HCN via hydrolysis. In this manner the pretreating adsorbent may be able to remove essentially all impurities from compressed offgas stream 116, with the exception of BTEX and NH3, both of which may captured and destroyed in the downstream separation steps. For purposes of this disclosure, the removal of essentially all impurities may be defined as removal of greater than 94%, greater than 95%, greater than 96%, greater than 97%, greater than 98%, or greater than 99% of all impurities.

Treated offgas stream 122 may then be separated in carbon dioxide separation section 130 to produce carbon-dioxide enriched stream 132 and carbon-dioxide depleted stream 134. In some embodiments carbon dioxide separation section 130 may comprise a pressure swing adsorption (PSA) system that may utilize beds filled with adsorbents with high selectivity for CO2 over other components in treated offgas stream 122, such as silica gel, faujasite zeolites (X and Y) comprising Si/Al ratios ranging from 1.0 to 5.0, as well as zeolites including A, chabazite, mordenite, rho, erionite, ferrierite and clinoptilolite. A rinse step may be employed and/or the beds may be evacuated under vacuum at an absolute pressure ranging from 0.05 to 0.3 bara (0.7 to 4.4 psia) to improve CO2 purity. Carbon dioxide separation section 130 may comprise a compressor to compress carbon dioxide-enriched stream 132 if needed prior to downstream processing. In at least some embodiments the beds may comprise a guard layer on the feed end to protect the main adsorbent from breakthrough from pretreatment section 120 and/or from heavy hydrocarbons such as BTEX. The guard layer may comprise activated alumina, silica gel, activated carbon, zeolites with Si/Al ratios greater than 2.5, or combinations thereof, and may have particle diameters ranging from 2 to 6 mm. In at least some embodiments the guard layer may be replaced with a guard bed upstream of carbon dioxide separation section 130. In some embodiments carbon dioxide separation section 130 may comprise an absorber such as an amine scrubber. In some embodiments, carbon dioxide separation section 130 may comprise an absorber, wherein the absorbent may be sensitive to trace O2 in treated offgas stream 122 and may not remove BTEX and/or NH3.

Carbon dioxide-enriched stream 132 may then enter dehydrator 140 to produce dry carbon dioxide product 142 and dehydrator tail gas stream 144. Dry carbon dioxide product 142 may then be delivered to a pipeline, cryogenic purification, liquefier, or sequestration. In some embodiments carbon dioxide product 142 may have a purity of at least 85% CO2 by volume, or at least 95% CO2 by volume. Dehydrator 140 may comprise a thermal swing adsorber (TSA). The TSA may comprise two beds filled with dehydrating adsorbent to remove water, NH3, and BTEX from carbon dioxide-enriched stream 132.

The adsorbents may comprise silica gel, activated alumina, a composite of alumina/zeolite, zeolites such as 4A, 5A, 13X, NaY, chabazite, erionite, mordenite, clinoptilolite or combinations thereof. The beds may comprise a guard layer at the feed end as in the case of carbon dioxide separation section 130. The TSA may be operated by feeding carbon dioxide-enriched stream 132 through the first bed while the second bed may be regenerated by heating while feeding regeneration gas stream 136 to drive off impurities from the second bed and may produce dehydrator tail gas stream 144. When the first bed reaches capacity for impurities, the beds may be switched and carbon dioxide-enriched stream 132 may feed the second bed while the first bed regenerates. In at least some embodiments regeneration gas stream 136 may be a waste gas stream with low amounts of water and oxidizing gases to prolong the life of the adsorbents. In at least some embodiments dehydrator tail gas stream 144 may be recycled to the feed stream at the start of regeneration to increase overall $CO_2$ recovery. In at least some embodiments the fraction of dehydrator tail gas stream 144 recycled to the feed stream at the start of regeneration is less than 5%, or less than 1%.

In some embodiments, dehydrator tail gas stream 144 may comprise $H_2$ ranging from 1% to 10% by volume, or from 4% to 10% by volume, and/or CO ranging from 0.1% to 10% by volume, or from 1% to 10% by volume, which may be in excess of certain regulatory restrictions. Dehydrator tail gas stream 144 may enter thermal oxidizer 150 in which an oxidant such as air may be used to combust any $H_2$ and CO present and produce vent stream 152 comprising at least 85% $N_2$ by volume on a dry basis. In at least some embodiments, $NH_3$ and BTEX captured by carbon dioxide separation section 130 may be oxidized in thermal oxidizer 150 to form water, nitrogen, and $CO_2$. Vent stream 152 may be vented to the atmosphere.

Carbon dioxide-depleted stream 134 may be treated in deoxo system 160 if downstream processing is sensitive to trace oxygen impurities. For example, supported CuCl may be used for CO adsorption but may be oxidized by trace oxygen and lose capacity. In addition, oxygen impurities may greatly reduce the recovery of hydrogen purification downstream if high purity $H_2$ is desired. Deoxo system 160 may comprise a catalyst to react oxygen impurities with hydrogen in carbon dioxide-depleted stream 134 to produce carbon monoxide separation feed stream 162. If there are no significant oxygen impurities in carbon dioxide-depleted stream 134 or if downstream processing is not sensitive to trace oxygen impurities at the concentrations present, deoxo system 160 may be omitted and carbon dioxide-depleted stream 134 may directly form carbon monoxide separation feed stream 162.

Carbon monoxide separation feed stream 162 may then enter carbon monoxide separation section 170. In some embodiments carbon monoxide separation section 170 comprises a cryogenic distillation system, especially when the nitrogen content in carbon monoxide separation feed stream 162 is low. In at least some embodiments carbon monoxide separation section 170 may comprise a PSA system. The CO PSA adsorbent may selectively adsorb CO to produce CO product stream 172 and allows CO-depleted stream 174 enriched in $N_2$ and $H_2$ to pass through. Suitable adsorbent materials with a high CO/$N_2$ selectivity may include supported CuCl, CaX, Ca-chabazite, CuY, Ag-exchanged zeolites, and metal organic framework (MOF) adsorbents. In some embodiments CO product stream 172 may have a CO purity of at least 85% and a CO recovery of at least 90%. CO product stream 172 may be taken off the adsorbent beds by pulling a vacuum at an absolute pressure ranging from 0.05 to 0.3 bara (0.7 to 4.4 psia) to achieve this high purity and recovery. CO product stream 172 may be recycled to the blast furnace to reduce iron oxides to iron metal, thus reducing the total amount of coke required. If CO product stream 172 is recycled to the blast furnace, undesirable reactions may occur to form solid carbon by the reaction $2\ CO=CO_2+C$. This undesirable reaction may be hindered by the addition of $CO_2$ and/or $H_2$ to the CO product stream. At least a portion of CO product stream 172 may be utilized in chemical or fuel production.

CO-depleted stream 174 comprises $H_2$ and so may be separated in hydrogen purification section 180 to produce hydrogen product stream 182 and hydrogen purification tail gas stream 184. In some embodiments hydrogen purification section 180 may comprise a hydrogen PSA. In some embodiments, hydrogen purification section 180 may comprise a cryogenic separation device. In some embodiments, hydrogen purification section 180 may comprise one or more membranes with a greater permeability for hydrogen over nitrogen. If required, hydrogen purification section 180 may comprise one or more compressors to deliver CO-depleted stream 174 at a high pressure ranging from 10 to 30 bara (140 to 440 psia) to the hydrogen PSA. The adsorbents used in the hydrogen PSA may include any material with a high $N_2$ capacity such as CaA, CaX, Ca-chabazite, LiX, and LiLSX. In some embodiments the hydrogen purity of hydrogen product stream 182 may be greater than or equal to 80% by volume. In some embodiments the hydrogen purity of hydrogen product stream 182 ranges from 50% to 95%, or from 80% to 95% by volume and may be recycled to the blast furnace to act as a reducing agent. In some embodiments the hydrogen purity of hydrogen product stream 182 may be greater than 95%, or greater than 99%, and may be sold as a product or used in the direct reduction of iron. At least a portion of hydrogen purification tail gas stream 184 may be divided to form regeneration gas stream 134.

In some embodiments hydrogen purification tail gas stream 184 may contain $H_2$ and/or CO in excess of regulatory restrictions and may enter thermal oxidizer 150 in which air may be used to combust any $H_2$ and CO present and produce vent stream 152 comprising at least 85% $N_2$ by volume on a dry basis. Vent stream 152 may be vented to the atmosphere. A surprising result of the methods disclosed herein is, unlike other separation processes generally known in the art, a $N_2$-enriched stream may be safely and inexpensively vented.

Figure 2:
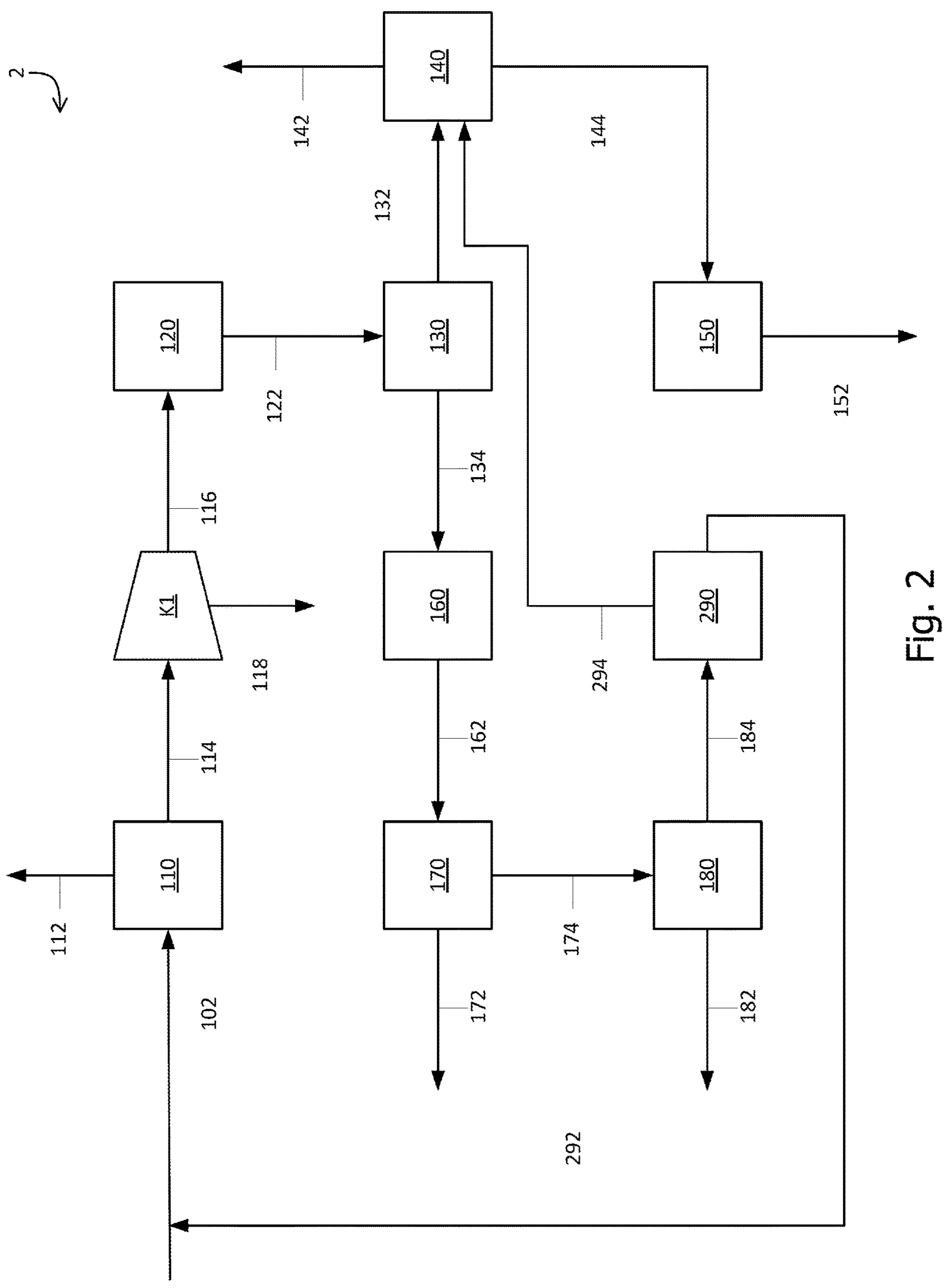
FIG. 2 is a schematic view depicting a modification of FIG. 1 in which a membrane section is used to separate a hydrogen purification tail gas stream.

FIG. 2 is a schematic view depicting a modification of FIG. 1 in which a membrane section is used to separate a hydrogen purification tail gas stream. In process 2, membrane section 290 may be used to separate hydrogen purification tail gas stream 184 to produce permeate stream 292 enriched in $H_2$ and $CO_2$ and retentate stream 294 enriched in CO and $N_2$. Permeate stream 292 may be recycled to feed stream 102 and at least a portion of retentate stream 294 may be used to regenerate dehydrator 140. Membrane section 290 may comprise a compressor to deliver hydrogen purification tail gas stream 184 at a high enough pressure to drive the separation, such as greater than or equal to 5 bara (70 psia).

The present disclosure may include, but may not be limited to, the following polymeric membranes: polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. The industrial gas separation methods disclosed herein may include, but may not be limited to polymers such as those listed above or rubbery materials such as silicone. Additional membrane materials may include, but may not be limited to mixed-matrix membranes, perfluoropolymers, thermally rearranged polymers, facilitated transport membranes, metal-organic frameworks, zeolitic-imidazolate frameworks, electrochemical membranes, metallic membranes, and carbon molecular sieves. The membrane material in the membrane separation system 90 may include, but may not be limited to the above materials. Membrane materials may also include: any other material that may have a faster permeation rate for some compounds such as hydrogen and a slower permeation rate for some compounds such as methane and carbon monoxide. In an embodiment in which the membrane material may comprise a metal highly selective to hydrogen, such as palladium, the membrane system 290 may operate at a high temperature, wherein the temperature may range from 280° C. to 440° C. (540° F. to 820° F.).

Suitable membrane materials may be manufactured as hollow fibers and packaged as membrane bundles, or may be manufactured as flat sheets, packaged as spiral-wound or plate-and-frame units, in order to provide a larger surface area to volume ratio, and housed in a module. Gas entering the module contacts the membrane, and a fraction of the gas permeates through the membrane and leaves the module in the lower-pressure permeate stream. The faster permeating gases may be enriched in the permeate relative to the slower permeating gases. The fraction of the gas that does not permeate through the membrane may leave the module in a non-permeate, or retentate, stream which may be enriched in the slower permeating gases relative to the faster permeating gases.

In some embodiments, hydrogen purification tail gas stream 184 may be treated prior to being introduced into membrane section 290 if there are any compounds present that may impair the operation of the membrane, such as heavy hydrocarbons (hexanes and heavier alkanes) and/or aromatics like BTEX. Pretreatment may be performed by adsorption, absorption, or partial condensation. In some embodiments, pretreatment may be unnecessary as the upstream pretreatment and separation sections may be expected to remove any dangerous compounds.

Figure 3:
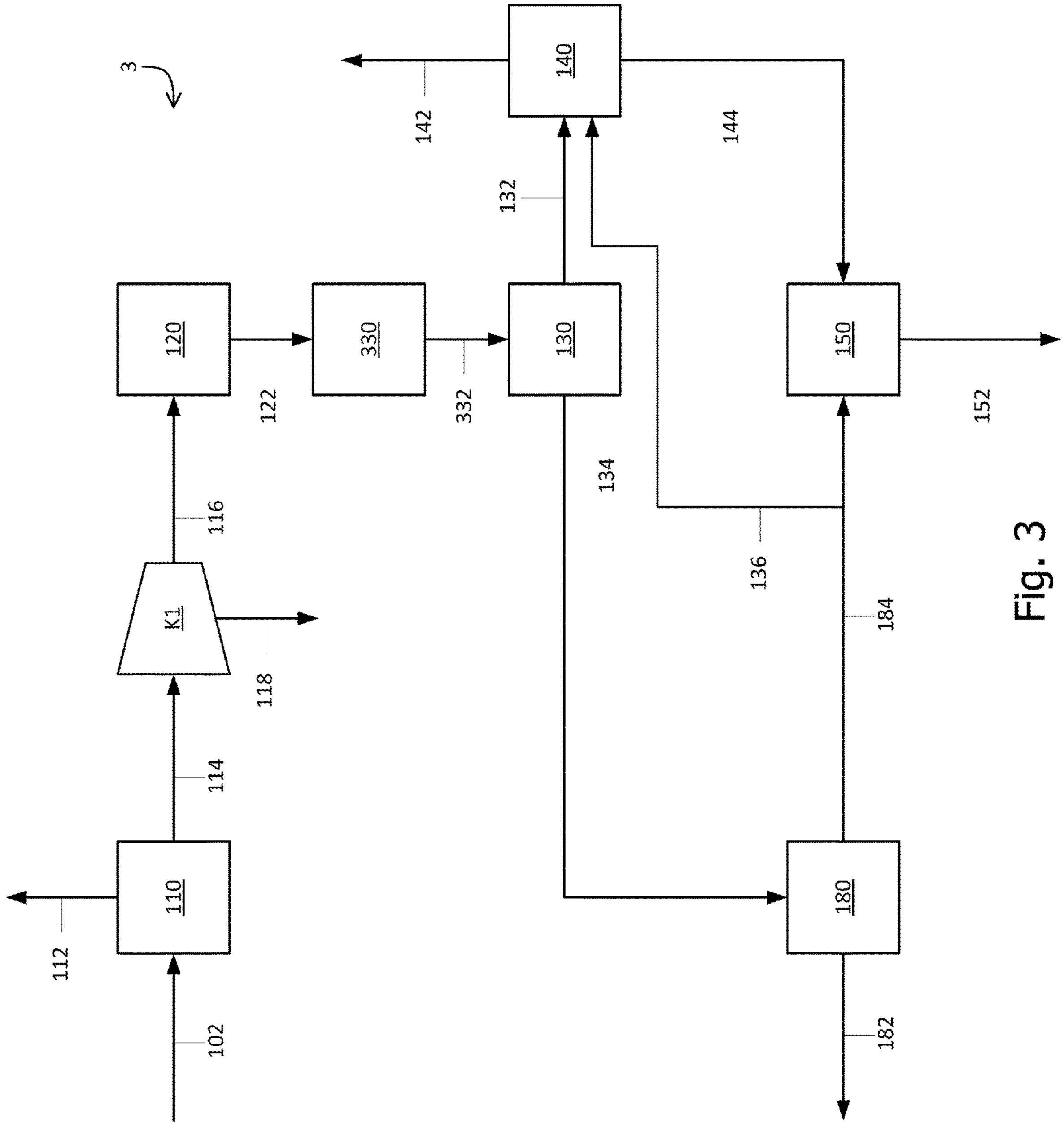
FIG. 3 is a schematic view depicting a modification of FIG. 1 in which a treated offgas stream undergoes a water gas shift reaction prior to separation.

FIG. 3 is a schematic view depicting a modification of FIG. 1 in which a treated offgas stream undergoes a water gas shift reaction prior to separation. In process 3, treated offgas stream 122 may enter water gas shift (WGS) section 330 to produce shifted offgas stream 332. Water gas shift section 330 may comprise one or more WGS reactors in series, each packed with shift catalyst to drive the reaction CO+H2O=CO2+H2. The shift catalyst may be poisoned by one or more impurities removed in pretreatment section 120. In some embodiments water gas shift section 330 may comprise a first WGS reactor at a higher feed temperature ranging from 300° C. to 450° C. (570° F. to 840° F.) using shift catalyst comprising iron, chromium, and magnesium oxides; and a second WGS reactor at a lower temperature ranging from 150° C. to 350° C. (300° F. to 660° F.) using shift catalyst comprising copper, zinc, and aluminum oxides. Shifted offgas stream 332 may have a minimal CO content which may eliminate the need for a carbon monoxide separation section, thereby allowing the shifted offgas stream to only require separation in carbon dioxide separation section 130 and hydrogen purification section 180 to produce carbon dioxide product 142 and hydrogen product 182. In some embodiments the CO concentration in shifted offgas stream 332 may less than 5% by volume, less than 4% by volume, less than 3% by volume, or less than 2% by volume. In some embodiments hydrogen product 182 may be utilized in a low-purity application, such as recycled to the blast furnace, and deoxo system 160 may be eliminated.

The CO2 content of shifted offgas stream 332 may increase in WGS system 330, which in some embodiments may range from 35 to 50% by volume. When carbon dioxide separation section 130 comprises a PSA, this may allow the shifted offgas stream 332 to enter the PSA at a lower pressure since the PSA may operate best when the partial pressure of CO2 in the feed is above a minimum value. In at least some embodiments the minimum partial pressure of CO2 in the feed may range from 1 to 4 bara (14 to 58 psia), from 1.25 to 3 bara (18 to 44 psia), or from 1.5 to 2 bara (21 to 29 psia). The lower pressure in the shifted offgas stream 332 entering the PSA may reduce the power consumption needed in upstream compression.

Figure 4:
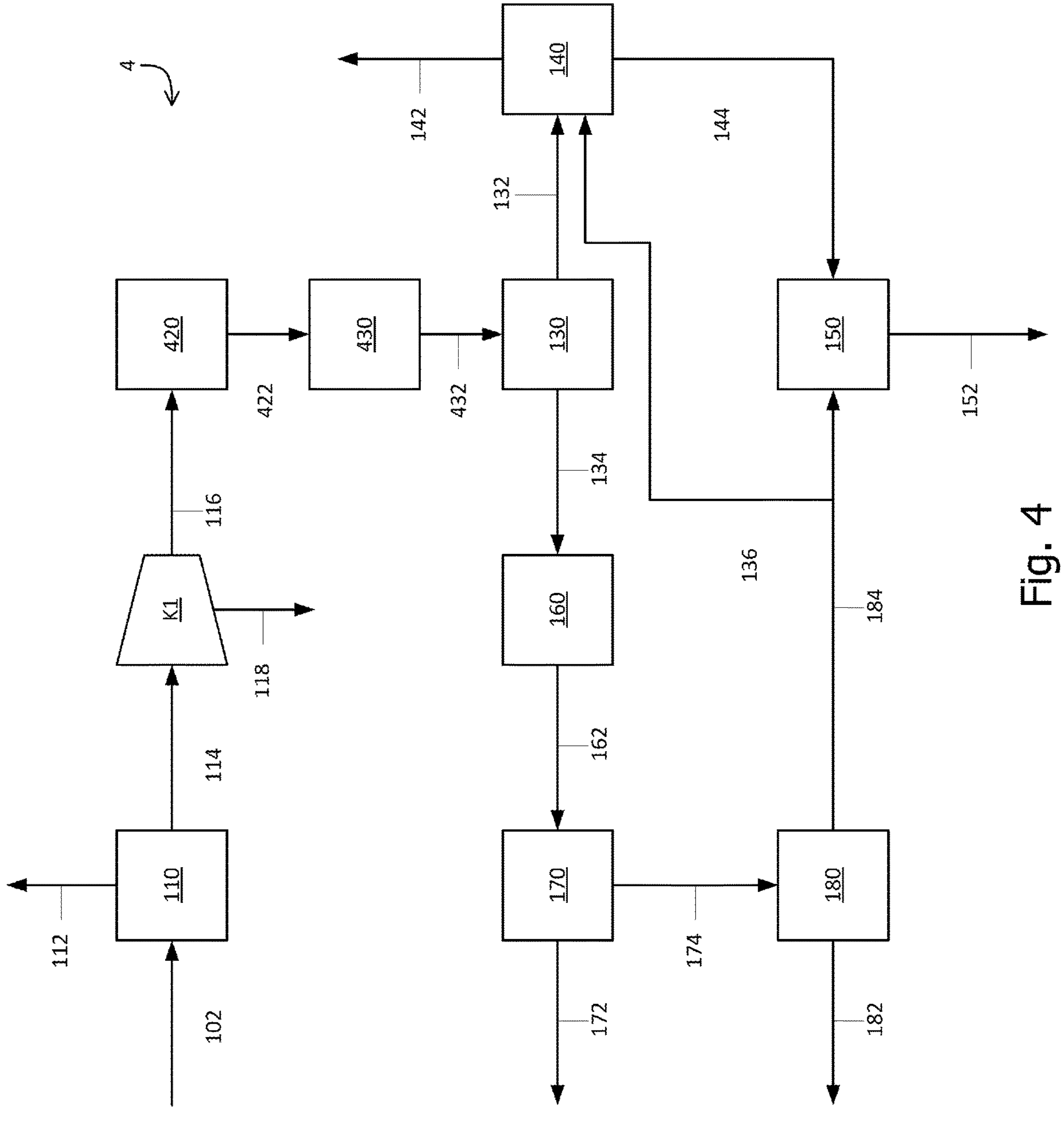
FIG. 4 is a schematic view depicting an embodiment of an offgas separation process according to one or more aspects of the present disclosure in which a compressed offgas stream is hydrolyzed before pretreatment.

FIG. 4 is a schematic view depicting an embodiment of an offgas separation process according to one or more aspects of the present disclosure in which a compressed offgas stream is hydrolyzed before pretreatment. In process 4 compressed offgas stream 116 may enter hydrolysis reactor 420. Hydrolysis reactor 420 may comprise at least one metal oxide such as titania, alumina, hydroxide-modified alumina, CoMo catalyst on an alumina support, hydrotalcite, or combinations thereof to catalyze the reaction of COS+H2O=H2S+CO2 and produce COS-depleted stream 422. In some embodiments the temperature in hydrolysis reactor 420 may range from 50° C. to 100° C. (120° F. to 212° F.) and no preheating of compressed offgas stream 116 may be required.

COS-depleted stream 422 may enter desulfurization section 430 to remove H2S and produce H2S-depleted stream 432. In some embodiments desulfurization section 430 may comprise an activated carbon bed in a two-bed lead/lag arrangement that removes essentially all H2S, SOx, and NOx, as well as partially removing heavy hydrocarbons such as BTEX and Fe(CO)5. In some embodiments desulfurization section 430 may comprise an iron-based getter that may remove only H2S by the various reactions including: FeO+H2S=FeS+H2O, Fe2O3+3H2S=Fe2S3+3H2O, Fe2S3+3O2=Fe2(SO3)2, Fe2(SO3)2+3H2S=Fe2O3+5S+3H2O. In some embodiments desulfurization section 430 may comprise a zinc oxide bed that may react with H2S to form zinc sulfide and water.

H2S-depleted stream 432 may enter carbon dioxide separation section 130 as in FIG. 1. In some embodiments impurities such as Fe(CO)5, BTEX, NH3, and HCN may be removed in a guard bed or a guard layer as in FIG. 1. These impurities that are not completely removed by desulfurization section 430 may also be removed in dehydrator 140 along with water.

Figure 5:
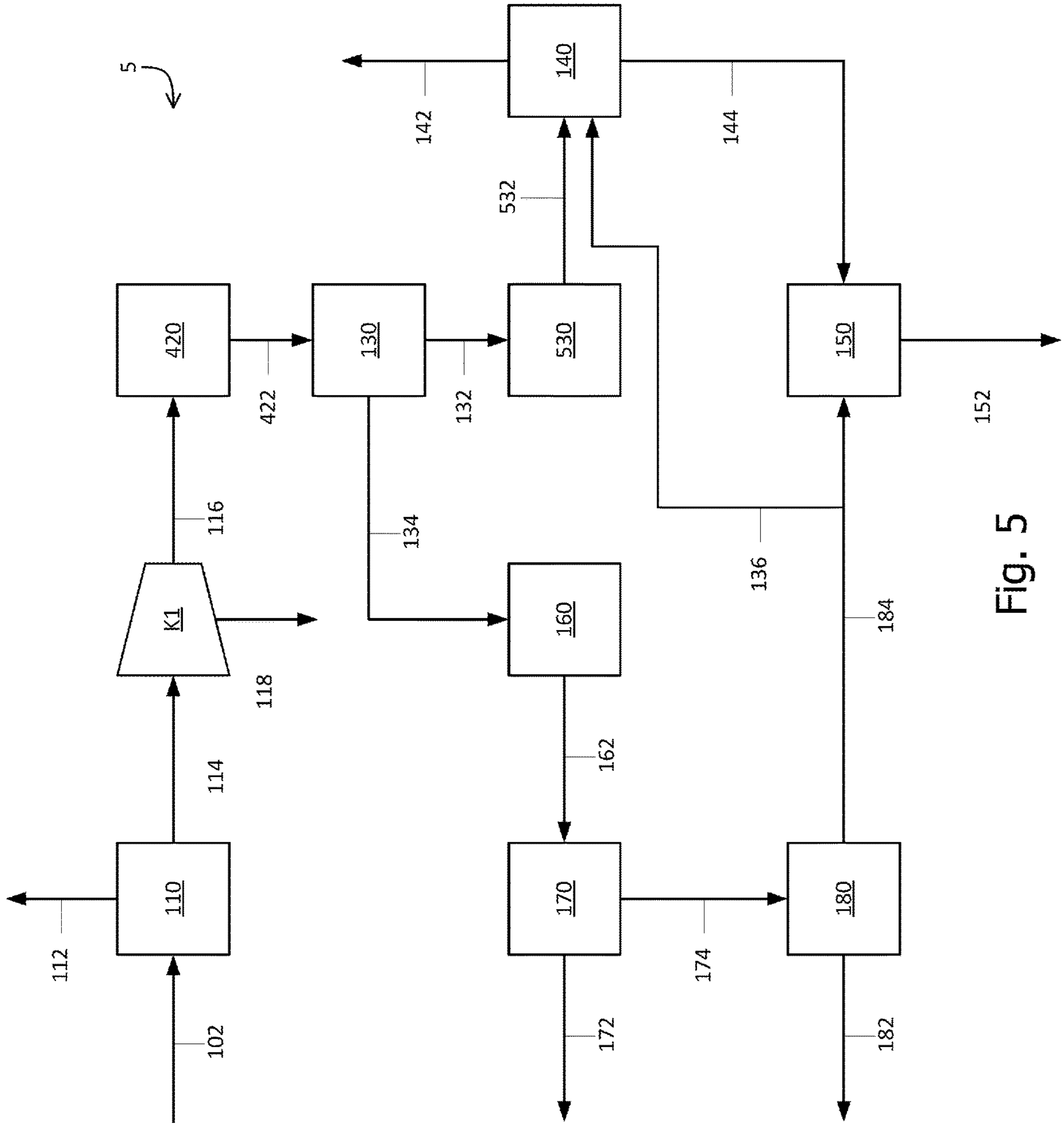
FIG. 5 is a schematic view depicting a modification of FIG. 4 in which desulfurization takes place downstream of carbon dioxide removal.

FIG. 5 is a schematic view depicting a modification of FIG. 4 in which desulfurization may occur downstream of carbon dioxide removal. In process 5, desulfurization may occur after carbon dioxide removal. COS-depleted stream 422 may enter the carbon dioxide separation section 130 where impurities such as Fe(CO)5, BTEX, NH3, H2S, and HCN may be adsorbed onto a guard layer and exit with carbon dioxide-enriched stream 132. Carbon dioxide-enriched stream 132 may then be purified in desulfurization section 530 which may operate in a similar manner to FIG. 3 but may be smaller due to the smaller feed flow rate. H2S-depleted stream 532 may then enter dehydrator 140. A person skilled in the art may appreciate that desulfurization section 530 may operate more effectively with a wet gas stream and may be located upstream of dehydrator 140.

Aspects of this invention include, but are not limited to:

Aspect 1: A method comprising contacting an offgas stream comprising H2, H2O, CO, CO2, and at least one impurity comprising COS with at least one metal oxide to catalyze a reaction of H2O and COS to form H2S and CO2 in the offgas stream; contacting the offgas stream with an $H_2S$-adsorbent to remove $H_2S$ from the offgas stream to produce a treated gas stream; and separating the treated gas stream to produce a carbon dioxide-enriched stream and a carbon dioxide-depleted stream.

Aspect 2: A method comprising contacting an offgas stream comprising $H_2$, $H_2O$, CO, $CO_2$, and at least one impurity comprising COS with at least one metal oxide to catalyze a reaction of $H_2O$ and COS to form $H_2S$ and $CO_2$ in the offgas stream; separating the offgas stream to produce a carbon dioxide-enriched stream and a carbon dioxide-depleted stream; contacting the carbon dioxide-enriched stream with an $H_2S$-adsorbent to remove $H_2S$ from the carbon dioxide-enriched stream.

Aspect 3: A method according to Aspect 1 or Aspect 2, wherein the at least one metal oxide comprises at least one of alumina, titania, $MnO_2$, CuO, CaO, MgO, and NiO.

Aspect 4: A method according to any of Aspects 1 to 3, wherein the $H_2S$-adsorbent comprises at least one of zinc oxide, iron oxide, magnesium oxide, chromium oxide, cobalt oxide, copper oxide, manganese oxide and activated carbon.

Aspect 5: A method according to any of Aspects 1 to 4, wherein the at least one impurity further comprises $H_2S$, SOx, NOx, HCN, $NH_3$, and/or BTEX.

Aspect 6: A method according to Aspect 5, further comprising contacting the offgas stream with an HCN hydrolysis catalyst to catalyze a reaction of HCN and $H_2O$ to form $NH_3$ and CO in the offgas stream.

Aspect 7: A method according to any of Aspects 1 to 6, wherein the absolute value of the total concentration of water in the offgas stream minus the total concentration of water in the treated gas stream is less than 500 ppmv.

Aspect 8: A method according to any of Aspects 1 to 7, wherein the absolute value of the total concentration of oxygen in the offgas stream minus the total concentration of oxygen in the treated gas stream is less than 500 ppmv.

Aspect 9: A method according to any of Aspects 1 to 8, further comprising contacting the treated offgas stream with a water gas shift catalyst prior to separation to produce carbon dioxide-enriched stream and the carbon dioxide-depleted stream.

Aspect 10: A method according to any of Aspects 1 to 9, wherein the offgas stream has a temperature ranging from 50 to 300° C. when contacted with the at least one metal oxide.

Aspect 11: A method according to any of Aspects 1 to 10, wherein a pretreating adsorbent comprises the at least one metal oxide and the $H_2S$-adsorbent.

Aspect 12: A method according to any of Aspects 1 to 11, further comprising separating the carbon dioxide-depleted stream or a stream derived from the carbon dioxide-depleted stream to produce a hydrogen product stream and a hydrogen-depleted tail gas stream.

Aspect 13: A method according to Aspect 12, further comprising contacting the carbon dioxide-enriched stream with a dehydrating adsorbent to produce a dry carbon dioxide product and a spent dehydrating adsorbent; and regenerating the spent dehydrating adsorbent with a regeneration gas stream to produce the dehydrating adsorbent and a spent regeneration gas stream; wherein the regeneration gas stream comprises at least a portion of the hydrogen-depleted tail gas stream or a stream derived from the hydrogen-depleted tail gas stream.

Aspect 14: A method according to Aspect 12 or Aspect 13, further comprising recycling at least a portion of the hydrogen product stream to a blast furnace; wherein the hydrogen product stream has a purity ranging 50% to 95%.

Aspect 15: A method according to any of Aspects 12 to 14, further comprising separating a carbon monoxide product from the carbon dioxide-depleted stream prior to separating the carbon dioxide-depleted stream or a stream derived from the carbon dioxide-depleted stream to produce a hydrogen product stream and a hydrogen-depleted tail gas stream.

Aspect 16: A method according to Aspect 15, further comprising removing oxygen from the carbon dioxide-depleted stream prior to separating the carbon monoxide product from the carbon dioxide-depleted stream.

Aspect 17: A method according to any of Aspects 12 to 16, further comprising separating the hydrogen-depleted tail gas stream by selective permeation prior to regenerating the spent dehydrating adsorbent to produce a hydrogen-enriched permeate stream and a hydrogen-depleted retentate stream; wherein the regeneration gas stream comprises at least a portion of the hydrogen-depleted retentate stream.

Aspect 18: A method according to Aspect 17, further comprising combining the hydrogen-enriched permeate stream with the offgas stream.

Aspect 19: A method according to any of Aspects 12 to 18, wherein the dehydrating adsorbent also removes $NH_3$ and BTEX from the carbon dioxide-enriched stream.

Aspect 20: A method according to any of Aspects 12 to 19, further comprising reacting the spent regeneration gas stream with an oxidant to produce a vent stream; wherein the vent stream comprises at least 85% $N_2$ by volume.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The phrase "at least a portion" means "a portion or all." The "at least a portion of a stream" has the same composition, with the same concentration of each of the species, as the stream from which it is derived.

As used herein, "first," "second," "third," etc. are used to distinguish among a plurality of steps and/or features, and is not indicative of the total number, or relative position in time and/or space, unless expressly stated as such.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

It should be understood that, although individual examples may be discussed herein, the present disclosure covers all combinations of the disclosed examples, including, without limitation, the different component combinations, method step combinations, and properties of the system.

The invention claimed is:

1. A method comprising:

contacting an offgas stream comprising H2, H2O, CO, CO2, and at least one impurity comprising COS with a pretreating adsorbent in a pretreating adsorbent bed to catalyze a reaction of H2O and COS to form H2S and CO2 in the offgas stream and remove H2S from the offgas stream to produce a treated gas stream; and separating the treated gas stream to produce a carbon dioxide-enriched stream and a carbon dioxide-depleted stream;

wherein the pretreating adsorbent comprises particles with a combination of an H2S-adsorbent and at least one metal oxide.

2. The method of claim 1, wherein the at least one metal oxide comprises at least one of alumina, titania, MnO2, CuO, CaO, MgO, and NiO.

3. The method of claim 1, wherein the H2S-adsorbent comprises zinc oxide.

4. The method of claim 1, wherein the at least one impurity further comprises H2S, SOx, NOx, HCN, NH3, and/or BTEX.

5. The method of claim 4, further comprising contacting the offgas stream with an HCN hydrolysis catalyst to catalyze a reaction of HCN and H2O to form NH3 and CO in the offgas stream.

6. The method of claim 1, wherein the absolute value of the total concentration of water in the offgas stream minus the total concentration of water in the treated gas stream is less than 500 ppmv.

7. The method of claim 1, wherein the absolute value of the total concentration of oxygen in the offgas stream minus the total concentration of oxygen in the treated gas stream is less than 500 ppmv.

8. The method of claim 1, further comprising contacting the treated offgas stream with a water gas shift catalyst prior to separation to produce carbon dioxide-enriched stream and the carbon dioxide-depleted stream.

9. The method of claim 1, wherein the offgas stream has a temperature ranging from 230 to 300° C. when contacted with the at least one metal oxide.

10. The method of claim 1, further comprising:

separating the carbon dioxide-depleted stream or a stream derived from the carbon dioxide-depleted stream to produce a hydrogen product stream and a hydrogen-depleted tail gas stream;

contacting the carbon dioxide-enriched stream with a dehydrating adsorbent to produce a dry carbon dioxide product and a spent dehydrating adsorbent; and regenerating the spent dehydrating adsorbent with a regeneration gas stream to produce the dehydrating adsorbent and a spent regeneration gas stream;

wherein the regeneration gas stream comprises at least a portion of the hydrogen-depleted tail gas stream or a stream derived from the hydrogen-depleted tail gas stream.

11. The method of claim 10, further comprising recycling at least a portion of the hydrogen product stream to a blast furnace; wherein the hydrogen product stream has a purity ranging 50% to 95%.

12. The method of claim 10, further comprising separating a carbon monoxide product from the carbon dioxide-depleted stream prior to separating the carbon dioxide-depleted stream or a stream derived from the carbon dioxide-depleted stream to produce a hydrogen product stream and a hydrogen-depleted tail gas stream.

13. The method of claim 12, further comprising removing oxygen from the carbon dioxide-depleted stream prior to separating the carbon monoxide product from the carbon dioxide-depleted stream.

14. The method of claim 10, further comprising separating the hydrogen-depleted tail gas stream by selective permeation prior to regenerating the spent dehydrating adsorbent to produce a hydrogen-enriched permeate stream and a hydrogen-depleted retentate stream;

wherein the regeneration gas stream comprises at least a portion of the hydrogen-depleted retentate stream.

15. The method of claim 14, further comprising combining the hydrogen-enriched permeate stream with the offgas stream.

16. The method of claim 10, wherein the dehydrating adsorbent also removes NH3 and BTEX from the carbon dioxide-enriched stream.

17. The method of claim 10, further comprising reacting the spent regeneration gas stream with an oxidant to produce a vent stream;

wherein the vent stream comprises at least 85% N2 by volume.

* * * * *